United States Patent [19]

Sato

[11] Patent Number: 5,345,442
[45] Date of Patent: Sep. 6, 1994

[54] MULTI-HIGHWAY SYSTEM OF DIGITAL EXCHANGE AND DIGITAL EXCHANGE HAVING THE MULTI-HIGHWAY SYSTEM

[75] Inventor: Kazuhiro Sato, Kawasaki, Japan

[73] Assignee: Fujitsu Limited, Kawasaki, Japan

[21] Appl. No.: 939,314

[22] Filed: Sep. 2, 1992

[30] Foreign Application Priority Data

Sep. 4, 1991 [JP] Japan .................................. 3-223922

[51] Int. Cl.⁵ ...................... H04L 12/00; H04L 12/48; H04Q 11/04
[52] U.S. Cl. ..................................... 370/58.3; 370/67; 370/85.1
[58] Field of Search ..................... 370/58.1, 58.2, 58.3, 370/67, 68.1, 85.1, 85.9, 112, 66; 379/246, 248, 327; 340/826, 825.79, 825.8

[56] References Cited

U.S. PATENT DOCUMENTS

| 4,527,266 | 7/1985 | Bogan et al. | 370/67 |
| 4,740,955 | 4/1988 | Litterer et al. | 370/67 |
| 4,787,081 | 11/1988 | Waters et al. | 370/67 X |
| 5,014,268 | 5/1991 | Tyrrell et al. | 370/67 X |
| 5,079,769 | 1/1992 | Ehricke et al. | 370/67 X |
| 5,267,309 | 11/1993 | Sanders et al. | 370/67 X |

Primary Examiner—Wellington Chin
Assistant Examiner—Melvin Marcelo

[57] ABSTRACT

A multi-highway system in a digital exchange includes a time division switch for exchanging time slots on N highways where N is an integer, and a plurality of card slot groups respectively including a plurality of card slots into which cards accommodating a plurality of lines are inserted. The N highways connect the time division switch and the plurality of card slot groups to each other. At least one of the card slot groups is assigned M highways out of the N highways where M is an integer satisfying $2 \leq M < N$.

14 Claims, 18 Drawing Sheets

FIG. I
PRIOR ART

MULTI-HIGHWAY SYSTEM OF DIGITAL EXCHANGE AND DIGITAL EXCHANGE HAVING THE MULTI-HIGHWAY SYSTEM

BACKGROUND OF THE INVENTION

1. Field of the Invention

The present invention generally relates to digital exchanges, and more particularly to a multi-highway system of a digital exchange intended to facilitate a line extension operation and a function extension operation.

2. Description of the Related Art

Recently, there has been considerable activity in down sizing of digital exchanges by means of down sizing of various electronic devices and integration of circuits with a high density. As down-sizing of digital exchanges is facilitated, an increased number of lines (circuits) can be accommodated in printed-circuit board packages of a line system. Further, subscriber lines are digitized and multiplexed, and hence the number of usable lines tends to increase. Furthermore, recent digital exchanges cooperate with computers and hence provide highway advanced functions. Nowadays, various cards having various functions are available. Under these circumstances, it is desired that digital exchanges be flexible with extension of line-system cards and functional cards.

A digital exchange includes a time division switch which exchanges time slots. FIG. 1 shows a related digital exchange. The digital exchange shown in FIG. 1 includes highways 11, a time division switch 12, cards 13, card slots 14, card slot groups 15, and shelves 16. The cards 13 respectively have printed-circuit board packages having a plurality of lines and/or various circuits. The cards 13 are inserted into the card slots 14. Each of the shelves 16 includes six card slot groups 15. Each of the card slot groups 15 includes four card slots 14. The highways 11 are respectively assigned to the card slot groups 15.

Each of the highways consists of a pair of an up highway and a down highway. The up highway extends from the corresponding cards 13 to the time division switch 12, and the down highway extends from the time division switch 12 to the corresponding cards 13. One highway consists of, for example, 32 time slots; 30 out of the 32 time slots are used for speed communications. Hence, 30 channels are provided for each of the card slot groups 15. The remaining two time slots are used for communications control. The time slots for communications control are assembled in a multiframe structure and further in a supermultiframe structure. Control information conveyed via the time slots for communications control is transferred between a common control unit (not shown) and each of the cards 13, for example, every 32 ms. Further, one shelf includes 8 highways. Generally, two highways among the eight highways are used for conference communications and service tones in the time division switch 12. Hence, six highways (HW1–HW6), (HW9–HW14), (HW17–HW22), (HW25–HW30) are provided between the time division switch 12 and each of the shelves 16, respectively.

The time division switch 12 is controlled by the common control unit, and performs an exchange operation in which the time slots in the highways connected to the card slot groups 15 are exchanged with each other. Another time division switch is known which includes a spatial switch in addition to the time division switch 12.

FIG. 2 is a perspective view of an equipment cabinet in which the four shelves 16 shown in FIG. 1 are accommodated. In FIG. 2, "TDSW" denotes the time division switch 12. Further, the equipment cabinet includes a common control unit (CCU) and a power supply unit.

As has been described previously, one highway 11 is assigned to one card slot group 15. If three cards each having eight lines and one card having six lines are placed in one of the card slot groups 15, the four card slots 14 are efficiently used. However, if one card having 30 lines is placed in one of the four card slots 14 in one of the card slot groups 15, the remaining three card slots 14 cannot be used. In this case, the card slot group 15 being considered is not efficiently used. Further, there is another disadvantage in that it is necessary to provide other card groups in an extended shelf in order to accommodate other cards irrespective of whether or not the remaining three card slots are used. For this requirement, it is necessary to provide an equipment cabinet having a large size, taking into account a future extension of cards. Further, as a practical problem, it is necessary to provide connection cables between the equipment cabinet and a main distribution frame (MDF) beforehand. Hence, the structure shown in FIG. 1 is not suitable for down-sizing and needs an expensive initial production cost.

SUMMARY OF THE INVENTION

It is a general object of the present invention to provide a multi-highway system of a digital exchange in which the above disadvantages are eliminated.

A more specific object of the present invention is to provide a multi-highway system of an economical digital exchange which is flexible with an extension of cards.

The above objects of the present invention are achieved by a multi-highway system in a digital exchange comprising: time division switch means for exchanging time slots on N highways, where N is an integer; and a plurality of card slot groups respectively including a plurality of card slots. Cards accommodating a plurality of lines are inserted into the card slots. The N highways connect the time division switch means and the plurality of card slot groups. At least one of the card slot groups is assigned M highways out of the N highways, where M is an integer satisfying $2 \leq M < N$.

Another object of the present invention is to provide a digital exchange having the above multi-highway system.

This object of the present invention is achieved by a digital exchange comprising: time division switch means for exchanging time slots on N highways, where N is an integer; a plurality of line circuits, coupled to the time division switch means and formed on cards having a plurality of lines, for connecting a plurality of terminals and the time division switch means to each other; a plurality of trunk circuits, coupled to the time division switch means and formed on cards having a plurality of lines, for connecting the time division switch means and a network to each other; and a plurality of card slot groups respectively including a plurality of card slots into which the cards are accommodated. The N highways connect the time division switch means and the plurality of card slot groups. At least one of the card slot groups is assigned M highways out of the N highways, where M is an integer satisfying $2 \leq M < N$.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 3:
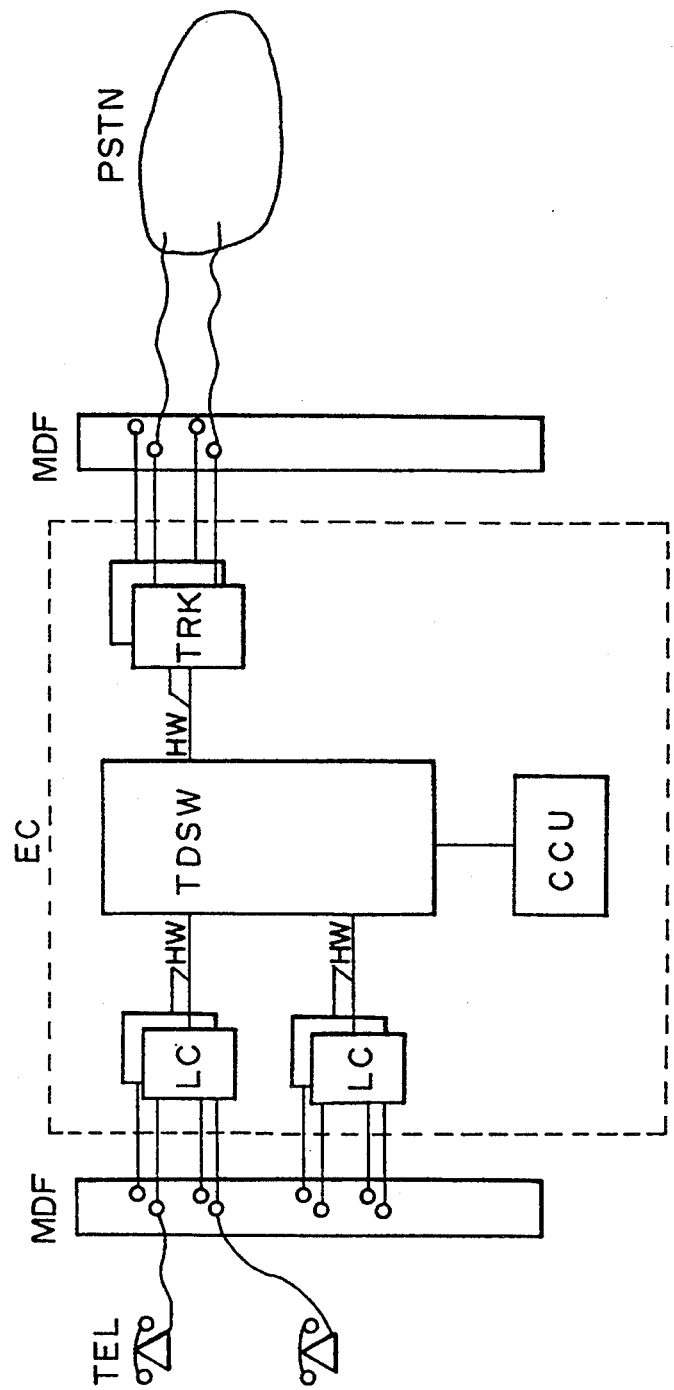
FIG. 3 is a block diagram of a digital exchange of the present invention.

FIG. 3 shows an overview of a digital exchange of the present invention. The digital exchange shown in FIG. 3 comprises an equipment cabinet EC, and main distribution frames MDF. Terminals, such as telephone sets, are connected to one of the main distribution frames MDF, and a public switched telephone network PSTN is connected to the other main distribution frame MDF.

The equipment cabinet EC accommodates a time division switch TDSW, a common control unit CCU, a plurality of line circuits LC, and a plurality of trunk circuits TRK. The time division switch TDSW and the line circuits LC are coupled to each other via highways HW, and the time division switch and the trunk circuits TRK are coupled to each other via highways HW. The line circuits LC and the trunk circuits TRK are implemented on cards, which cards are accommodated in card slots.

Figure 4:
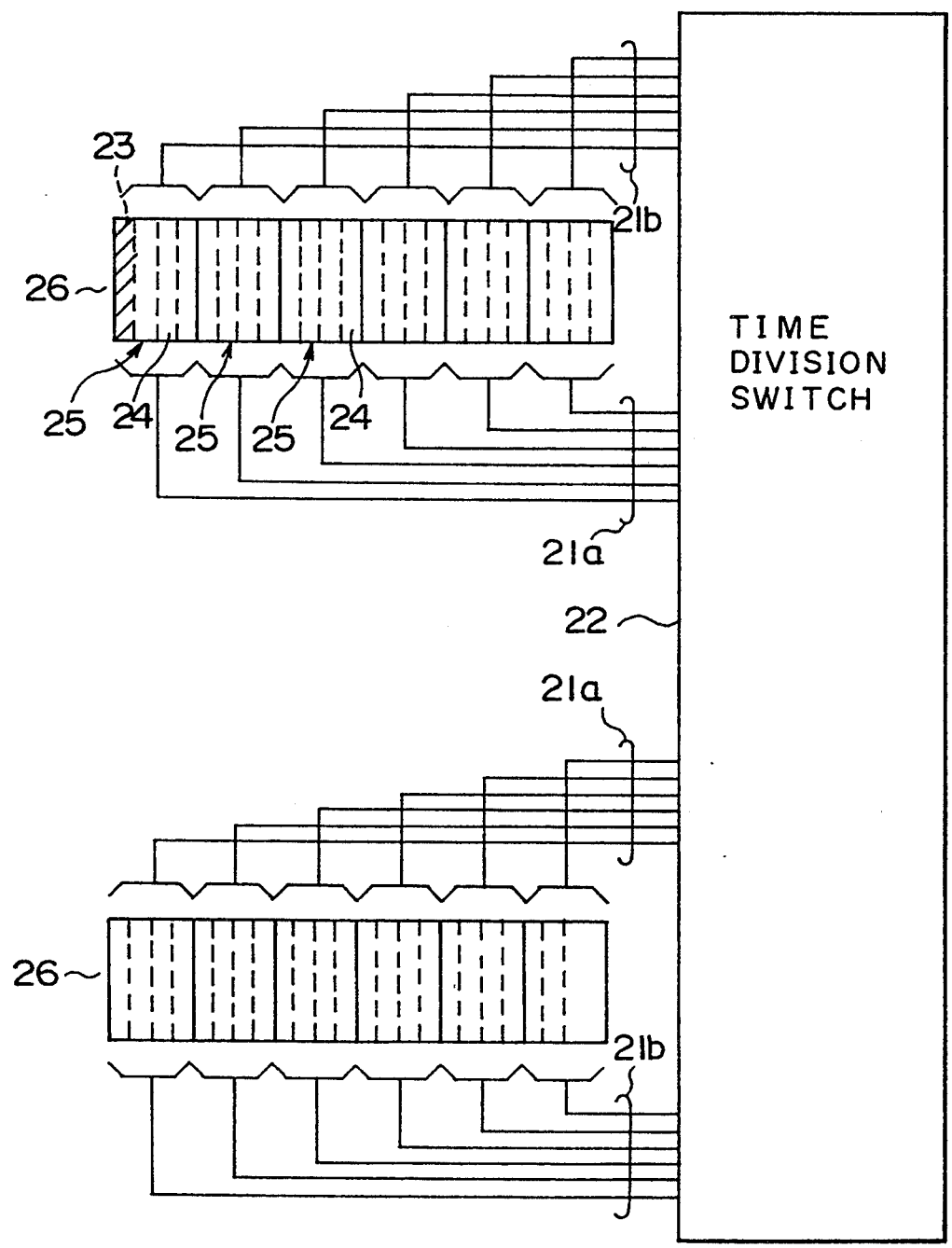
FIG. 4 is a block diagram showing an overview of a first embodiment of the present invention.

FIG. 4 is a block diagram showing an overview of a first embodiment of the present invention. More particularly, FIG. 4 shows structural elements installed in an equipment cabinet of a digital exchange according to the first embodiment of the present invention. The equipment cabinet accommodates a time division switch 22, and a plurality of shelves 26. The time division switch 22 corresponds to the time division switch TDSW shown in FIG. 3. Each of the shelves 26 includes a plurality of card slot groups 25. In the structure shown in FIG. 4, six card slot groups 25 are provided in one shelf 26. Each of the card slot groups 25 has a plurality of card slots 24, into which various cards 23 forming the line circuits LC and trunks TRK (FIG. 3) are inserted. In the structure shown in FIG. 4, four card slots 24 are provided in one card slot group 25. As shown in FIG. 4, a first group 21a of highways and a second group 21b of highways are provided for each of the shelves 26. More specifically, one highway of the first group 21a and one highway of the second group 21b are provided for each of the card slot groups 25. In other words, a plurality of highways are provided for each of the card slot groups 25. It is possible to provide some card slot groups in one shelf with a plurality of highways.

Figure 5:
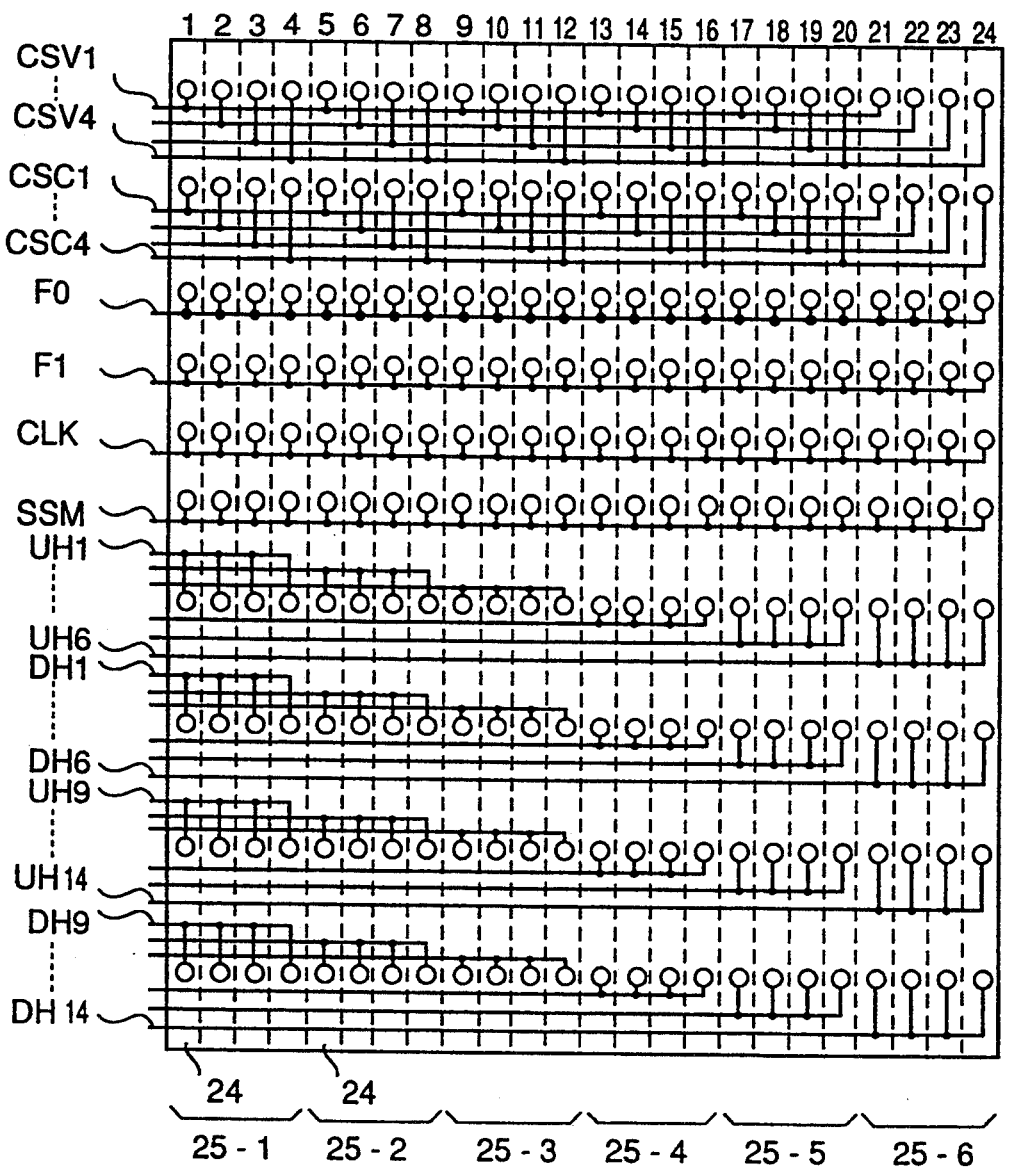
FIG. 5 is a wiring diagram of a shelf according to the first embodiment of the present invention.

FIG. 5 is a wiring diagram of one of the shelves 26 shown in FIG. 4. As described above, the shelf 26 has 24 card slots 24, and each of the card slot groups 25 consists of four card slots. Hence, the shelf 26 has six card slot groups 25-1-25-6. In FIG. 5, CSV1-CSV4, CSC1-CSC4, F0, F1, CLK and SSM are timing signals generated and output by the time division switch 22 shown in FIG. 4. These timing signals are used in conventional digital exchanges. More particularly, CSV1-CSV4 denote card select timing signals for speech communications, and CSC1-CSC4, F0 and F1 are card select timing signals for control signals. CLK denotes a clock signal having a frequency of, for example 256 kHz and defining time slots. SSM denotes a send/receive switch timing signal for control signals. A clock signal 2MCLK for bit timing, which will be described later, is omitted in FIG. 5.

The above-mentioned card select timing signals CSV and CSC are sequentially distributed so that a plurality of cards (lines) on an identical highway overlap each other on a highway interface. Each of the cards transmits and receives information with timings specified by the card select timing signals. Hence, the card select timing signals CSV and CSC define time slots used in the cards or lines.

Further, UH1-UH6 and UH9-UH14 are up highways from the cards 23 to the time division switch 22, and DH1-DH6 and DH9-DH14 are down highways from the time division switch 22 to the cards 23. It will be noted that the up highways UH9-UH14 and the down highways DH9-DH14 are newly provided in addition to the conventional up highways UH1-UH6 and the down highways DH1-DH6 according to the first embodiment of the present invention. The remaining two up highways UH7 and UH8 (not shown for the sake of convenience) and the remaining two down highways DH7 and DH8 (not shown) are used in common to all the card slot groups 25-1-25-6. These highways are used for, for example, conference speech and service tone. In the first embodiment of the present invention, two highways are physically provided for each of the card slot groups 25-1–25-6. However, it is also possible to provide each of the card slot groups 25-1–25-6 with three highways or more.

The card slot group 25-1 is provided with the up highways UH1 and UH9 and the down highways DH1 and DH9, and the card slot group 25-2 is provided with the up highways UH2 and UH10 and the down highways DH2 and DH10. In this manner, each of the remaining card slot groups 25-3–25-6 is provided with two up highways and two down highways. The above-mentioned timing signals and clock signals are supplied to the cards inserted into the card slots 24, and the highways are connected thereto. Each of the cards to be inserted into the card slots 24 has a highway selecting circuit for selecting one of the two up highways and one of the down highways.

Figure 6:
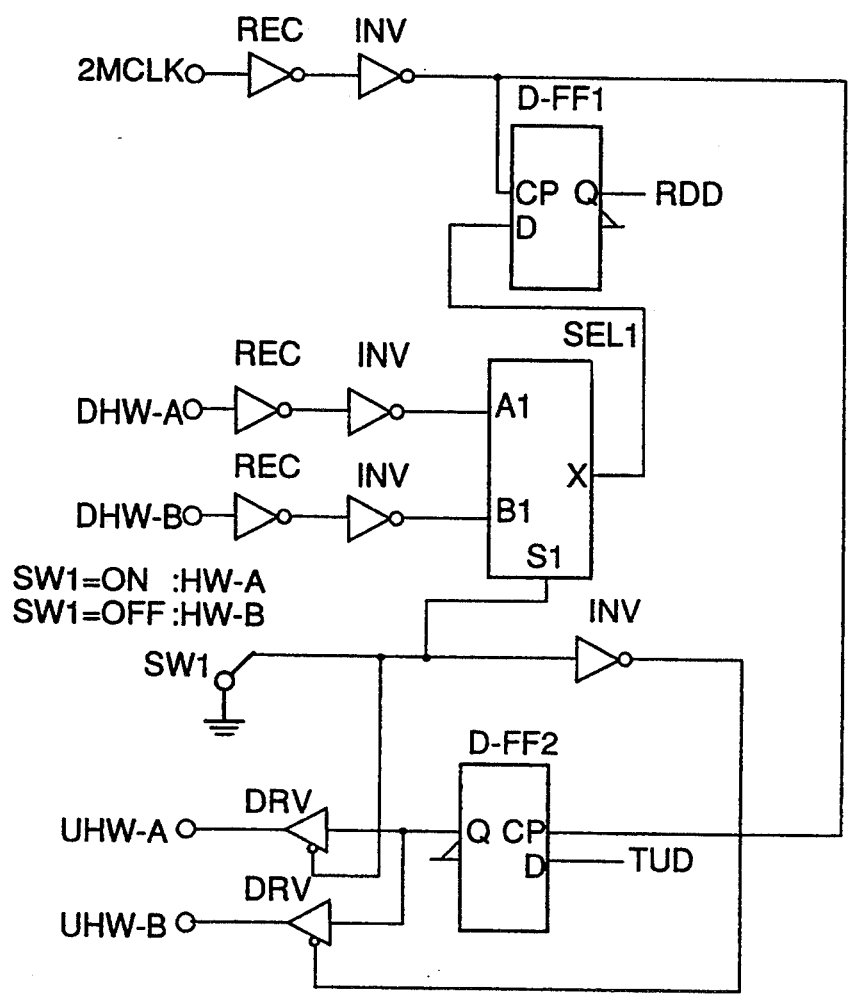
FIG. 6 is a block diagram of a highway selecting circuit according to the first embodiment of the present invention.

FIG. 6 is a block diagram of the above-mentioned highway selecting circuit installed in each of the cards. As shown in FIG. 6, the highway selecting circuit comprises receivers REC, inverters INV, drivers DRV, D-type flip-flops D-FF1 and D-FF2, a selector SEL1, and a switch SW1. Two down highways DHW-A and DHW-B from the time division switch 22 are coupled to terminals A1 and B1 of the selector SEL1 via the receivers REC and the inverters INV, respectively. Two up highways UHW-A and UHW-B extending to the time division switch 22 are coupled to a terminal Q of the flip-flop D-FF2 via the drivers DRV. The switch SW1 specifies which one of the two up highways and which one of the two down highways should be selected. One of two contacts of the switch SW1 is grounded, and the other contact is connected to a select terminal S1 of the selector SEL1, and a control terminal of the driver DRV connected to the up highway UHW-A. Further, the other contact of the switch SW1 is connected to a control terminal of the driver DRV connected to the up highways UHW-B via the inverter INV. The bit timing clock signal 2MCLK from the time division switch 22 passes through the receiver REC and the inverter INV, and is applied to clock terminals CP of the flip-flops D-FF1 and D-FF2. An output terminal X of the selector SEL1 is connected to a data terminal D of the flip-flop D-FF1. Received data RDD from the selected down highway is output to an internal circuit of the card (not shown for the sake of convenience) via a terminal Q of the flip-flop D-FF1. Transmission data TUD from the internal circuit is applied to a data terminal D of the flip-flop D-FF2.

When the switch SW1 is turned ON, the ground level is applied to the select terminal S1 of the selector SEL1, so that the down highway DHW-A is selected. Simultaneously, the group level is applied to the driver DRV connected to the up highway UHW-A, so that the up highway UHW-A is selected. When the switch SW1 is turned OFF, the down highway DHW-B and the up highway UHW-B are selected.

Figure 7:
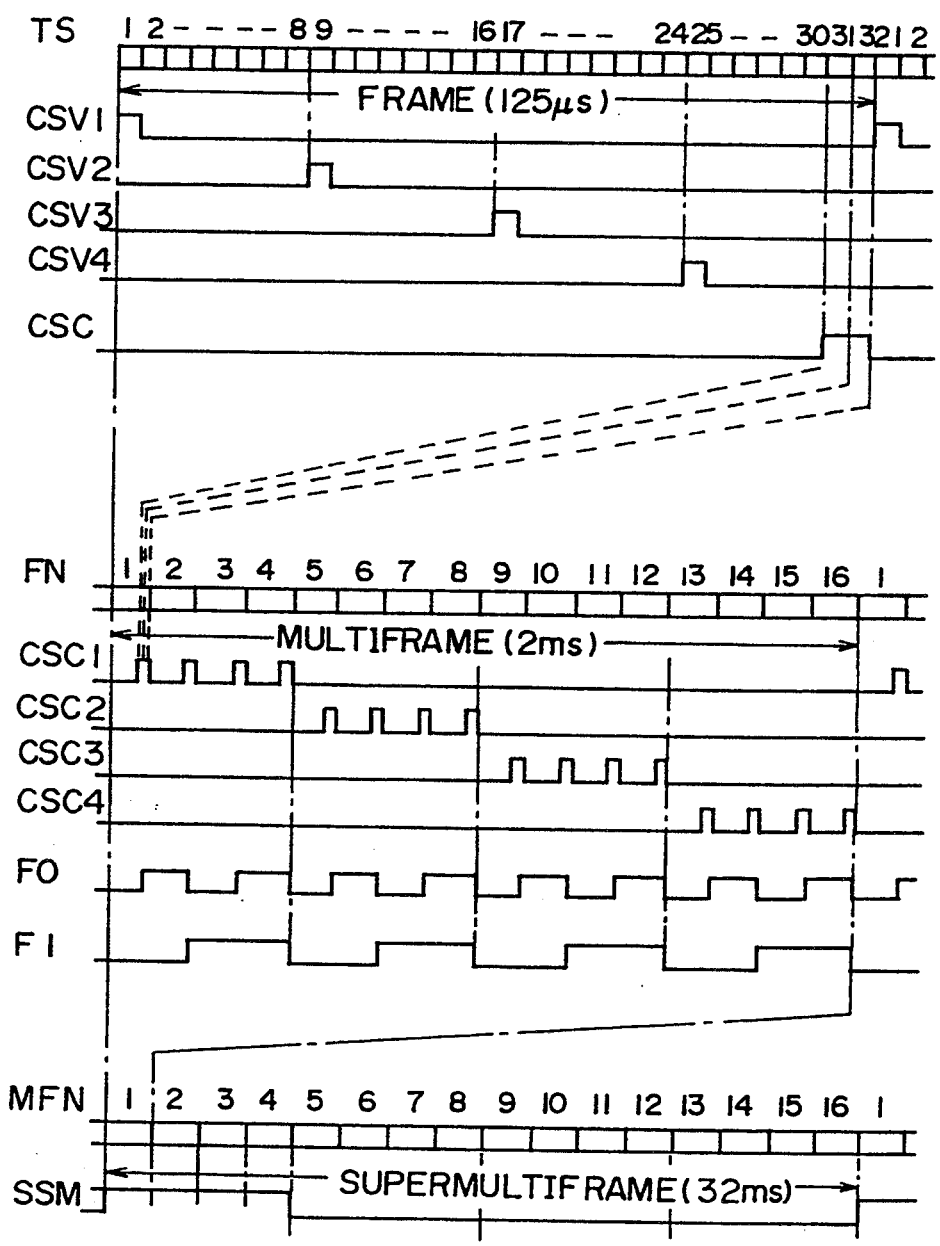
FIG. 7 is a timing chart showing the operation of the first embodiment of the present invention.

FIG. 7 is a timing chart illustrating the operation of the first embodiment of the present invention. In FIG. 7, TS denotes a time slot number, FN denotes a frame number, and MFN denotes a multiframe number. One frame amounting to 125 μs consists of 32 time slots, and one multiframe amounting to 2 ms consists of 16 frames. Further, one super multiframe amounting to 32 ms consists of 16 multiframes. 30 time slots respectively having time slot numbers 1–30 are used for transferring speech information, and two time slots respectively having time slot numbers 31 and 32 are used for transferring control signals.

The card select timing signal CSV1 for speech signals relates to the first card slot of each of the card slot groups 25-1–25-6. Similarly, the card select timing signals CSV2–CSV4 for speech signals respectively relate to the second, third and fourth card slots of each of the card slot groups 25-1–25-6. The card select timing signal CSC1 for control signals relates to frame numbers 1–4 and to the lines of the first card in each of the card slot groups 25-1–25-6 or line numbers 1–8. The card select timing signal CSC2 relates to frame numbers 5–8 and to the lines of the second card of each of the card slot groups 25-1–25-6 or line numbers 1–8. The card select timing signal CSC3 relates to frame numbers 9–12 and to the lines of the third card of each of the card slot groups 25-1–25-6 or line numbers 1–8. The card select timing signal CSC4 relates to frame numbers 13–16 and to the lines of the fourth card of each of the card slot groups 25-1–25-6 or line numbers 1–8.

The send/receive switch timing signal SSM for control signals causes control signals from the time division switch 22 (FIG. 4) to be sent to the cards in multiframe numbers 1–4 in one super multiframe, and causes control signals from the cards to be sent to the time division switch 22 in the multiframe numbers 5–16. A control signal equal to one byte is transferred via within one multiframe.

For example, when a card accommodating 30 lines is inserted into the first card slot of the card slot group 25-1 shown in FIG. 5, 30 time slots between this card and the time division switch 22 are available by means of a pair of up highway UH1 and down highway DH1. In this case, it is possible to accommodate cards respectively having eight lines, in the second, third and fourth card slots of the card slot group 25-1. In this case, 24 time slots between the three cards and the time division switch 22 are available by means of another pair of up highway UH9 and down highway DH9. Hence, all the card slots can be used. In this manner, the card slots can be efficiently used and down-sizing of digital exchanges can be facilitated.

A description will now be given of a second embodiment of the present invention.

Figure 8:
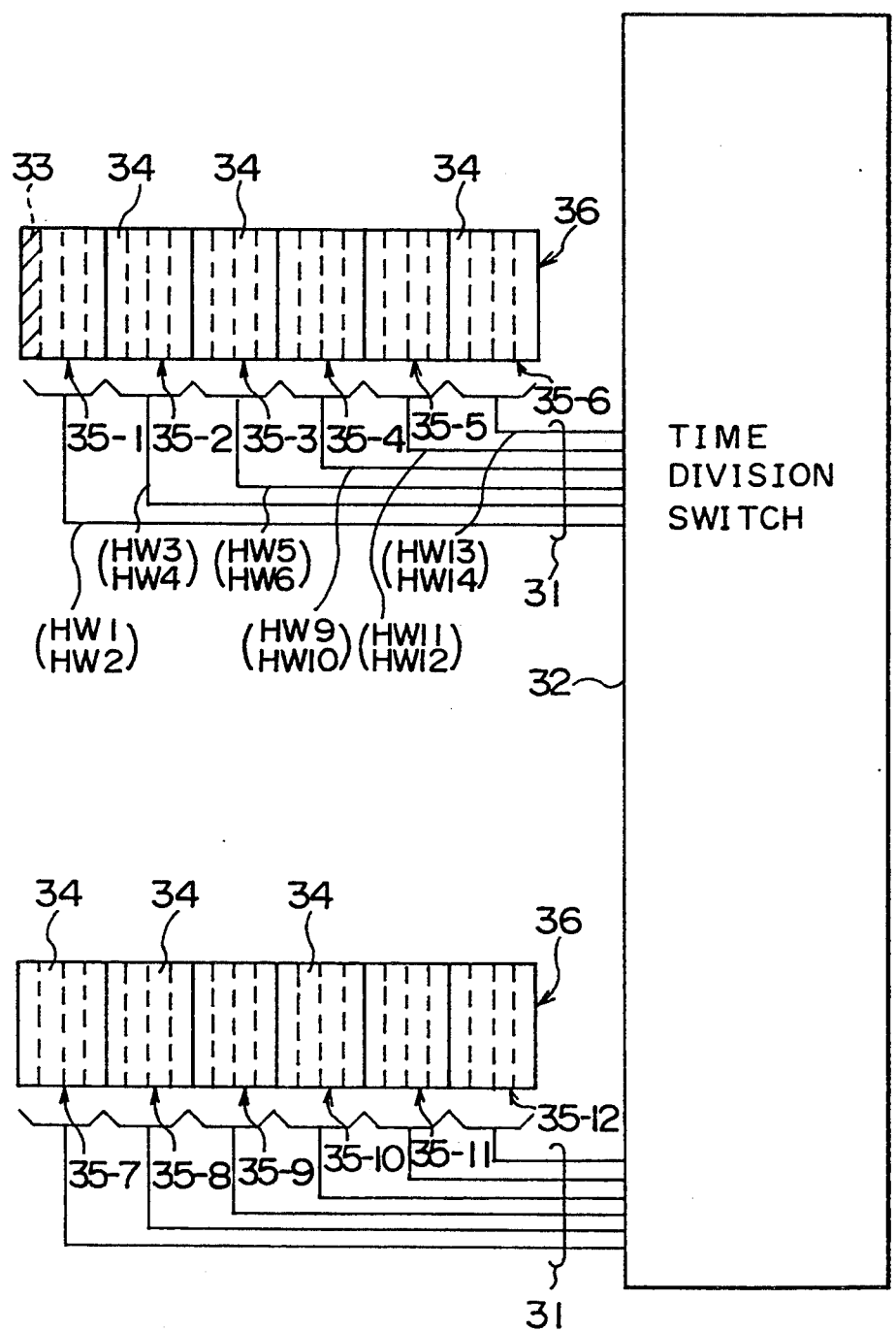
FIG. 8 is a block diagram showing an overview of a second embodiment of the present invention.

FIG. 8 is a block diagram showing an overview of a second embodiment of the present invention. The second embodiment of the present invention comprises a time division switch 32, a plurality of shelves 36, and highways 31 respectively provided for the shelves 36. The shelf 36 illustrated on the upper side of the drawing includes six card slot groups 35-1–35-6, and the shelf 36 illustrated on the lower side thereof includes six card slot groups 35-7–35-12. Each of the card slot groups 35-1–35-12 consists of four card slots 34.

According to the second embodiment of the present invention, two highways formed in time division multiplexing (a time shared manner) are provided for each card slot group. For example, the card slot group 35-1 is provided with two highways HW1 and HW2, and the card slot group 35-2 is provided with two highways HW3 and HW4. Further, two highways HW5 and HW6 are assigned to the card slot group 35-3, and two highways HW9 and HW10 are assigned to the card slot group 35-4. Two highways HW7 and HW8 are used, in the time division switch 32, for conference speech and service tone. Further, two highways HW11 and HW12 are assigned to the card slot group 35-5, and two highways HW13 and HW14 are assigned to the card slot group 35-6. In the same manner, six pairs of highways are respectively assigned to the six card slot groups 35-7–35-12.

Figure 9:
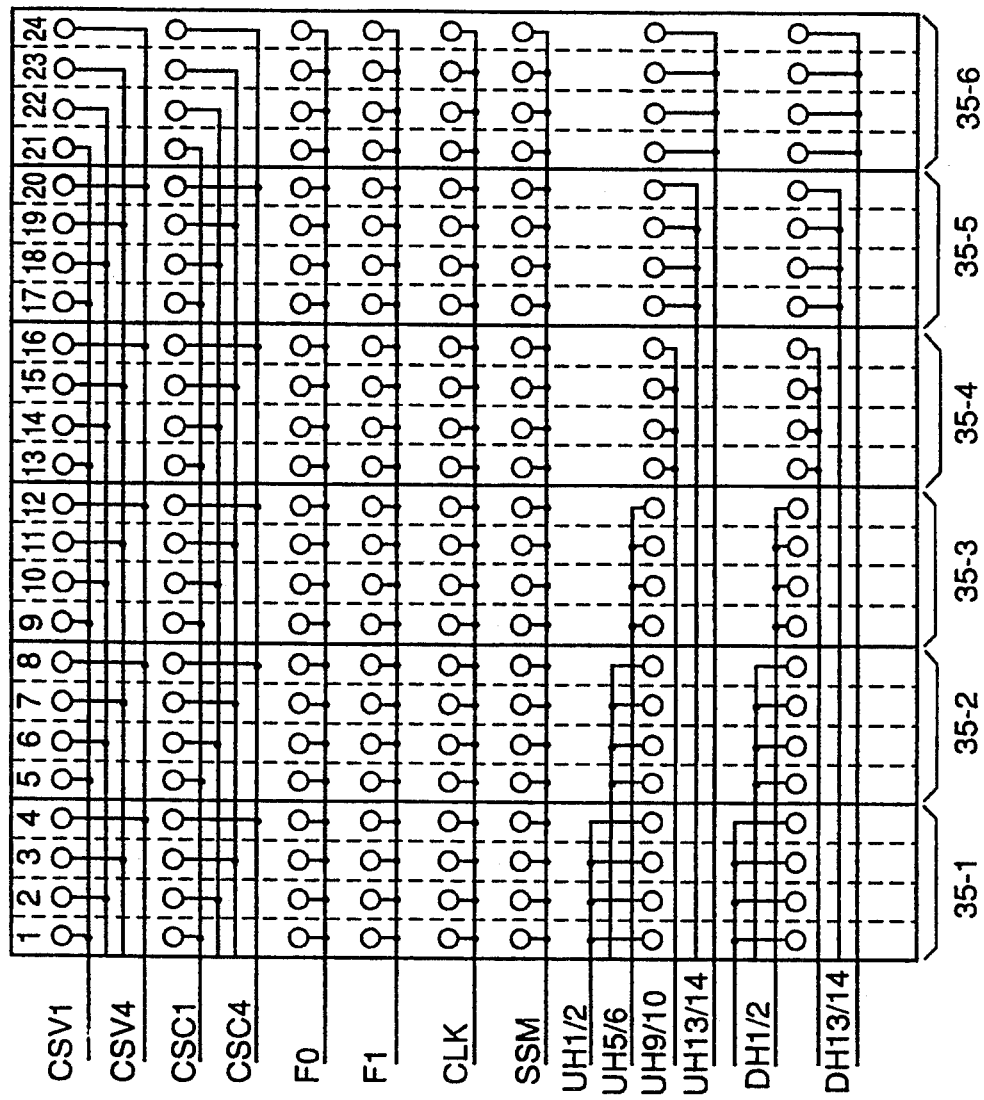
FIG. 9 is a wiring diagram of a shelf according to the second embodiment of the present invention.

FIG. 9 is a wiring diagram of the shelf 36 shown in FIG. 8. In FIG. 9, UH1/2–UH5/6 and UH9/10–UH13/14 denote up highways, and DH1/2–DH5/6 and DH9/10–DH13/14 denote down highways. The 2048 kHz clock signal is omitted for the sake of convenience.

Card slot numbers 1–4 form the card slot group 35-1 to which the up highways UH1/2 and down highways DH1/2 are connected. Card slot numbers 5–8 form the card slot group 35-2 to which the up highways UH3/4 and down highways DH3/4 are connected. Card slot numbers 9–12 form the card slot group 35-3 to which the up highways UH5/6 and down highways DH5/6 are connected. Card slot numbers 13–16 form the card slot group 35-4 to which the up highways UH9/10 and down highways DH9/10 are connected. Card slot numbers 17–20 form the card slot group 35-5 to which the up highways UH11/12 and down highways DH11/12 are connected. Card slot numbers 21–24 form the card slot group 35-6 to which the up highways UH13/14 and down highways DH13/14 are connected.

If a card accommodating 30 lines is inserted into the card slot number 1, and 30 time slots are used via the up highway UH1 and the down highway DH1, three cards respectively accommodating eight lines can be inserted into the card slot numbers 2–4 and time slots on the up highway UH2 and the down highway DH2 can be used.

Figure 10:
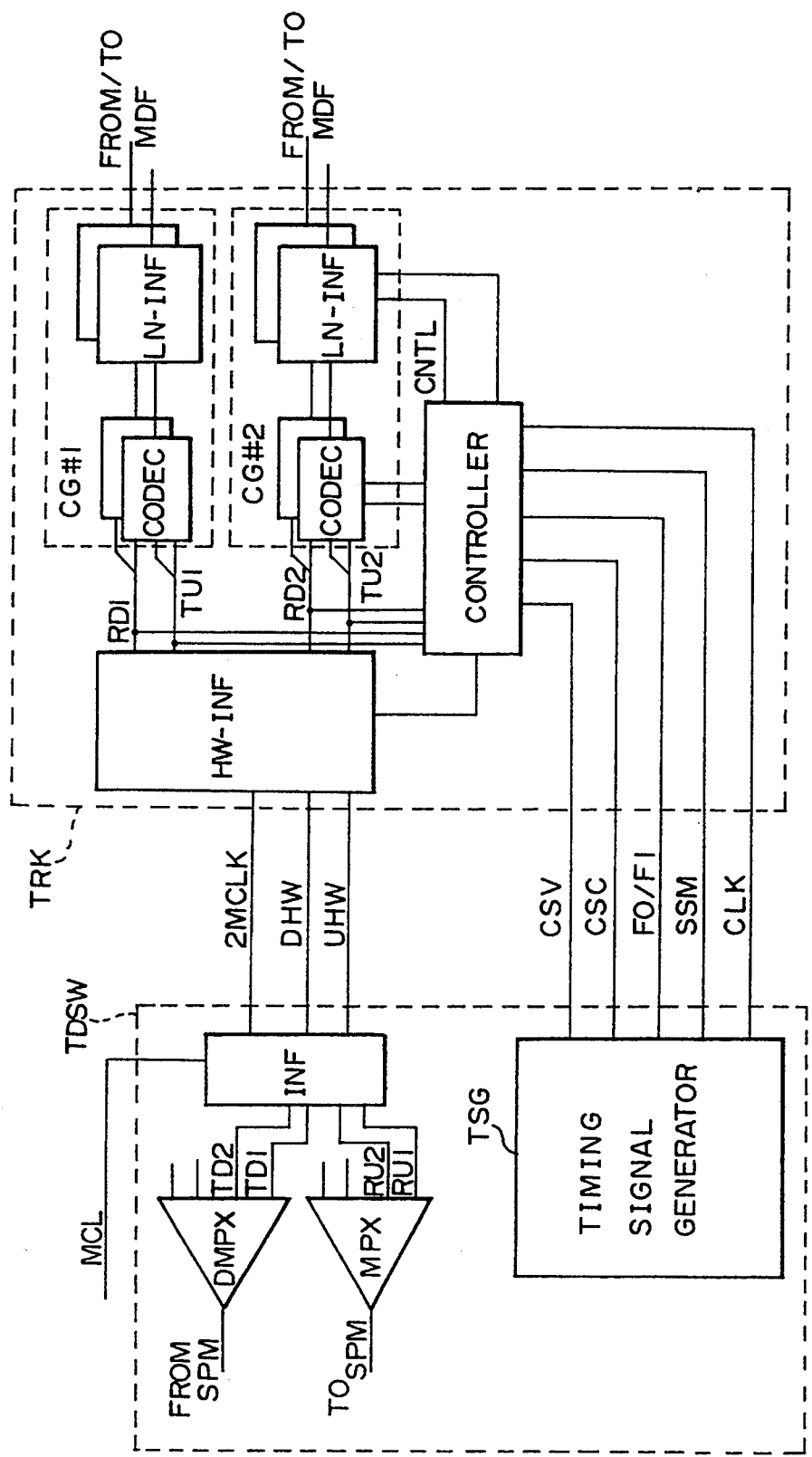
FIG. 10 is a block diagram of a digital exchange according to the second embodiment of the present invention.

FIG. 10 is a block diagram of an overview of a digital exchange according to the second embodiment of the present invention. More particularly, FIG. 10 shows the time division switch TDSW shown in FIG. 3, and a circuit trunk TRK mounted on a card. As has been described previously, the second embodiment of the present invention provides a plurality of time division multiplexed highways for each card slot group. Hence, the second embodiment of the present invention does not use a plurality of physical lines as in the case of the first embodiment of the present invention.

The time division switch TDSW comprises an interface circuit INF, a demultiplexer DMPX, a multiplexer MPX, and a timing signal generator TSG. The demultiplexer DMPX and the multiplexer MPX are coupled to a speech path memory SPM (not shown for the sake of convenience). The interface circuit INF establishes an interface between an up highway UHW and a down highway DHW, and the demultiplexer DMPX and the multiplexer MPX. In actuality, a plurality of interface circuits (not shown) of cards are provided for a pair of up and down highways. The details of the interface circuit INF will be described later. The demultiplexer DMPX demultiplexes a speech signal transferred from the speech path memory, and distributes transmission data to the interface circuits INF. Two transmission data segments TD1 and TD2 are applied to the interface INF illustrated in FIG. 10. The multiplexer MPX receives data from the interface circuits INF and generates a multiplexed speech signal supplied to the speech path memory. In FIG. 10, received data segments RU1 and RU2 from the interface circuit INF depicted in FIG. 10 are applied to the multiplexer MPX. The timing signal generator TSG generates the aforementioned timing or clock signals CSV, CSC, F0/F1, SSM and CLK.

The trunk circuit TRK shown in FIG. 10 comprises a highway interface circuit HW-INF, line group units CG#1 and CG#2, and a controller CNTL. Each of the line group units CG#1 accommodates, for example, eight lines, and comprises codec units (coder/decoder units) CODEC, and line interface circuits LN-INF. The line group units CG#1 and CG#2 are connected to the main distribution frame MDF shown in FIG. 3.

Figure 11:
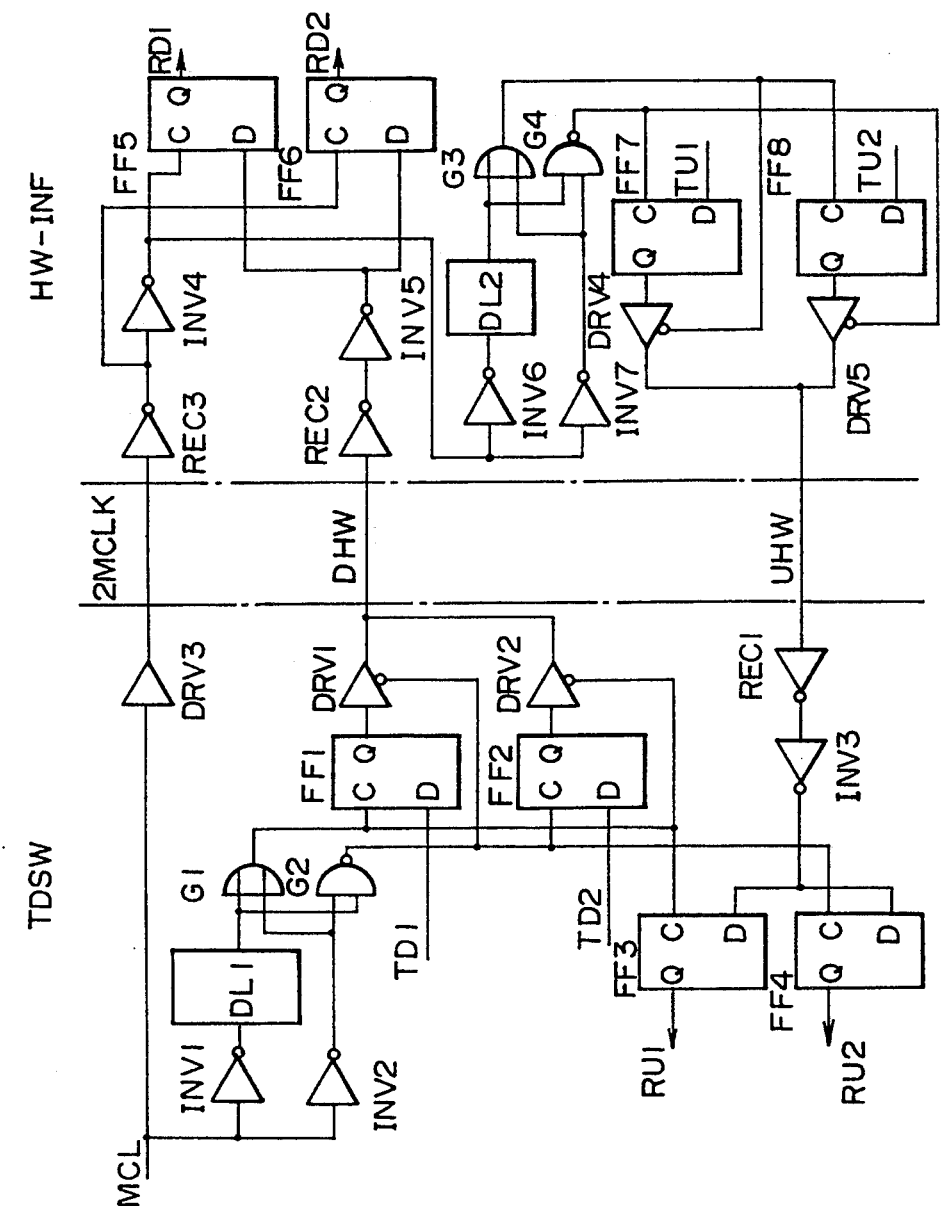
FIG. 11 is a block diagram showing a time division switch shown in FIG. 10 and a highway interface circuit shown therein.

FIG. 11 is a block diagram of the interface circuit INF and the highway interface circuit HW-INF shown in FIG. 10. The time division switch TDSW comprises inverters INV1–INV3, drivers DRV1–DRV3, a receiver REC1, a delay circuit DL1, D-type flip-flops FF1–FF4, an OR gate G1, and a NAND gate G2. The highway interface HW-INF comprises inverters INV4–INV7, drivers DRV3–DRV4, receivers REC2–REC3, a delay circuit DL2, D-type flip-flops FF5–FF8, an OR gate G3, and a NAND gate G4.

The delay circuits D1 and D2 are used for generating a guard time necessary to transfer data bits via the up and down highways UHW and DHW in time division multiplexing. More particularly, the output signal of the NAND circuit G2 is switched to "0" when a time corresponding to a delay time of the delay circuit DL1 has elapsed after the output signal of the OR circuit G1 changes from "0" to "1". The output signal of the OR circuit G1 is switched to "0" when a delay time corresponding to the delay time of the delay circuit DL1 has elapsed after the output signal of the NAND circuit G2 switches from "0" to "1". The delay circuit DL2, the OR circuit G3 and the NAND circuit G4 generate a guard time in the same way as described above.

The drivers DRV1, DRV2, DRV4, and DRV5 respectively have a function of setting their output terminals to high impedance states as in the case of three-state gate circuits. The drivers DRV1 and DRV2 alternately operate with respect to the down highway DHW, and the drivers DRV4 and DRV5 alternately operate with respect to the up highway UHW.

Transmission data segments TD1 and TD2 from the demultiplexer DMPX shown in FIG. 10 are respectively applied to data terminals D of the flip-flops FF1 and FF2. Received data segments RU1 and RU2 applied to the multiplexer MPX shown in FIG. 10 are output via terminals Q of the flip-flops FF3 and FF4, respectively. Received data segments RD1 and RD2 applied to the codec units shown in FIG. 10 are output via terminals Q of the flip-flops FF5 and FF6. Transmission data segments TU1 and TU2 from the codec units are applied to data terminals of the flip-flops FF7 and FF8.

Figure 12:
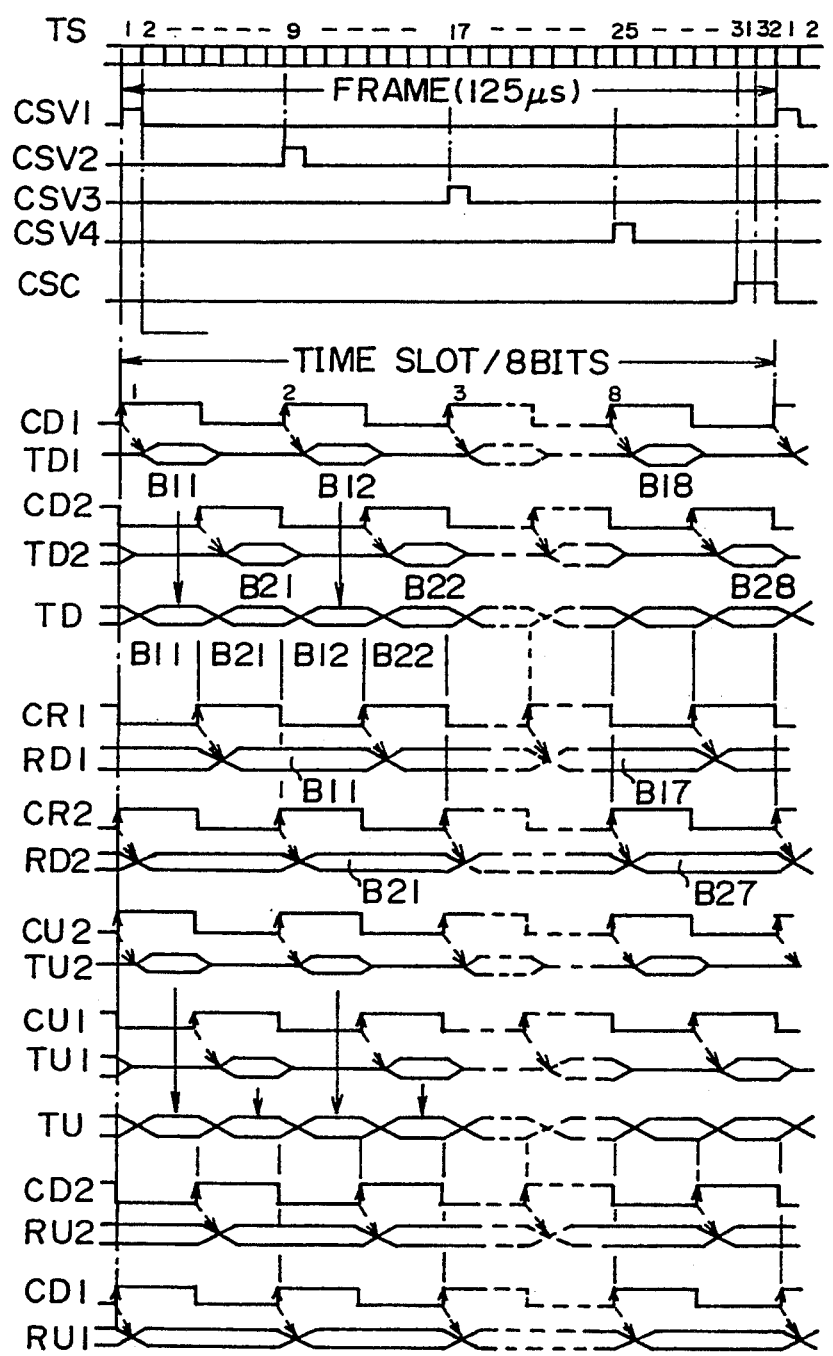
FIG. 12 is a timing chart showing the operation of the second embodiment of the present invention.

FIG. 12 is a timing chart illustrating the operation of the third embodiment of the present invention. In FIG. 12, CD1 and CD2 denote transmission clock signals from the OR circuit G1 and the NAND circuit G2, respectively. TD denotes transmission data transferred via the down highway DHW. CR2 denotes a received clock signal obtained via the inverter INV4, and CR1 denotes a received clock signal via the receiver REC3. CU1 and CU2 denote transmission clock signals from the NAND circuit G4 and the OR circuit G3. For the sake of simplicity, guard times generated by the delay circuits DL1 and DL2 are omitted for the sake of convenience.

The main clock signal MCL has a frequency of 2048 kHz, and is transferred from the driver DRV3 of the interface circuit to the highway interface circuit HW-INF of each card. In the operation shown in FIG. 12, one time slot consists of eight bits. When the first bit B11 of the transmission data TD1 transferred via the down highway DH#1 is applied to the data terminal D of the flip-flop FF1, and the transmission clock signal CD1 from the OR circuit G1 is applied to the clock terminal C of the flip-flop FF1, the first bit B11 is written into the flip-flop FF1 in synchronism with the rise of the transmission clock signal CD1. At this time, the transmission clock signal CD2 from the NAND circuit G2 is equal to "0", and hence the first bit B11 is output to the down highway DHW via the driver DRV1. The driver DRV2 is maintained in the high-impedance state since the transmission clock signal from the OR circuit G1 is equal to "1".

When the transmission clock signal CD2 from the NAND gate G2 is switched to "1", the first bit B21 of the transmission data TD2 transferred via the down highway DH#2 is written into the flip-flop FF2 in synchronism with the rise of the transmission clock signal CD2. At this time, the transmission clock CD1 from the OR circuit G1 is equal to "0", and hence the first bit B21 is output to the down highway DHW via the driver DRV2. In this manner, as shown in TD in FIG. 12, the transmission data TD1 and TD2 respectively supplied from the down highways DH#1 and DH#2 are transferred via the down highway DHW in bit multiplexing form. The clock signal 2MCLK from the time division switch TDSW is received by the receiver REC3 and then inverted by the inverter INV4. Then, the clock signal CR2 from the inverter INV4 is applied to the clock terminal C of the flip-flop FF6, and the clock signal CR1 from the receiver REC3 is applied to the clock terminal C of the flip-flop FF5. The data TD received via the receiver REC2 is applied to the data terminals D of the flip-flops FF5 and FF6 via the inverter INV5. The flip-flops FF5 and FF6 respectively latch data in synchronism with the clock signals applied to the respective clock terminals C. Hence, as shown in RD1 and RD2 in FIG. 12, it is possible to separately receive data segments related to the down highways DH#1 and DH#2.

The transmission clock signal with respect to the up highway UHW is generated from the clock signal CR2 from the inverter INV4 by the inverters INV6 and INV7, the delay circuit. DL2, the OR circuit G3 and the NAND circuit G4. More particularly, CU2 shown in FIG. 12 denotes a transmission clock signal applied from the OR circuit G3 to the clock terminal C of the flip-flop FF8. CU1 denotes a transmission clock signal applied from the NAND gate G4 to the clock terminal C of the flip-flop FF7. The aforementioned guard times are omitted in FIG. 12. The transmission data TU1 is written into the flip-flop FF7 in synchronism with the transmission clock signal CU1. The transmission data TU2 is written into the flip-flop FF8 in synchronism with the transmission clock signal CU2. Then, the transmission data segments TU1 and TU2 are output to the up highway UHW via the drivers DRV4 and DRV5 in bit multiplexing form.

The transmission clock signal CD1 from the 0R circuit G1 is applied to the clock terminal C of the flip-flop FF3. The transmission clock signal CD2 from the NAND circuit G2 is applied to the clock terminal C of the flip-flop FF4. Data TU transferred via the up highway UHW is applied from the receiver REC1 to the data terminals D of the flip-flops FF3 and FF4 via the inverter INV3. In this manner, as shown in RU1 and RU2 in FIG. 12, data segments can be separated from each other and output to the respective up highways UH#1 and UH#2.

The received data segments RD1 and RD2 respectively output from the flip-flops FF5 and FF6 are respectively data segments transferred via the down highways DH#1 and DH#2. The transmission data segments TU1 and TU2 respectively applied to the flip-flops FF7 and FF8 are data transferred via the up highways UH#1 and UH#2. Hence, a card having the interfaces shown in FIG. 11 can use two highways, and has lines as many as twice the number of lines in the prior art at most.

A description will now be given of a third embodiment of the present invention. The third embodiment of the present invention comprises a highway selecting means for specifying highways to be used. Further, the third embodiment comprises a card slot selecting means for specifying a logical card slot position of the card irrespective of the physical position thereof.

Figure 13:
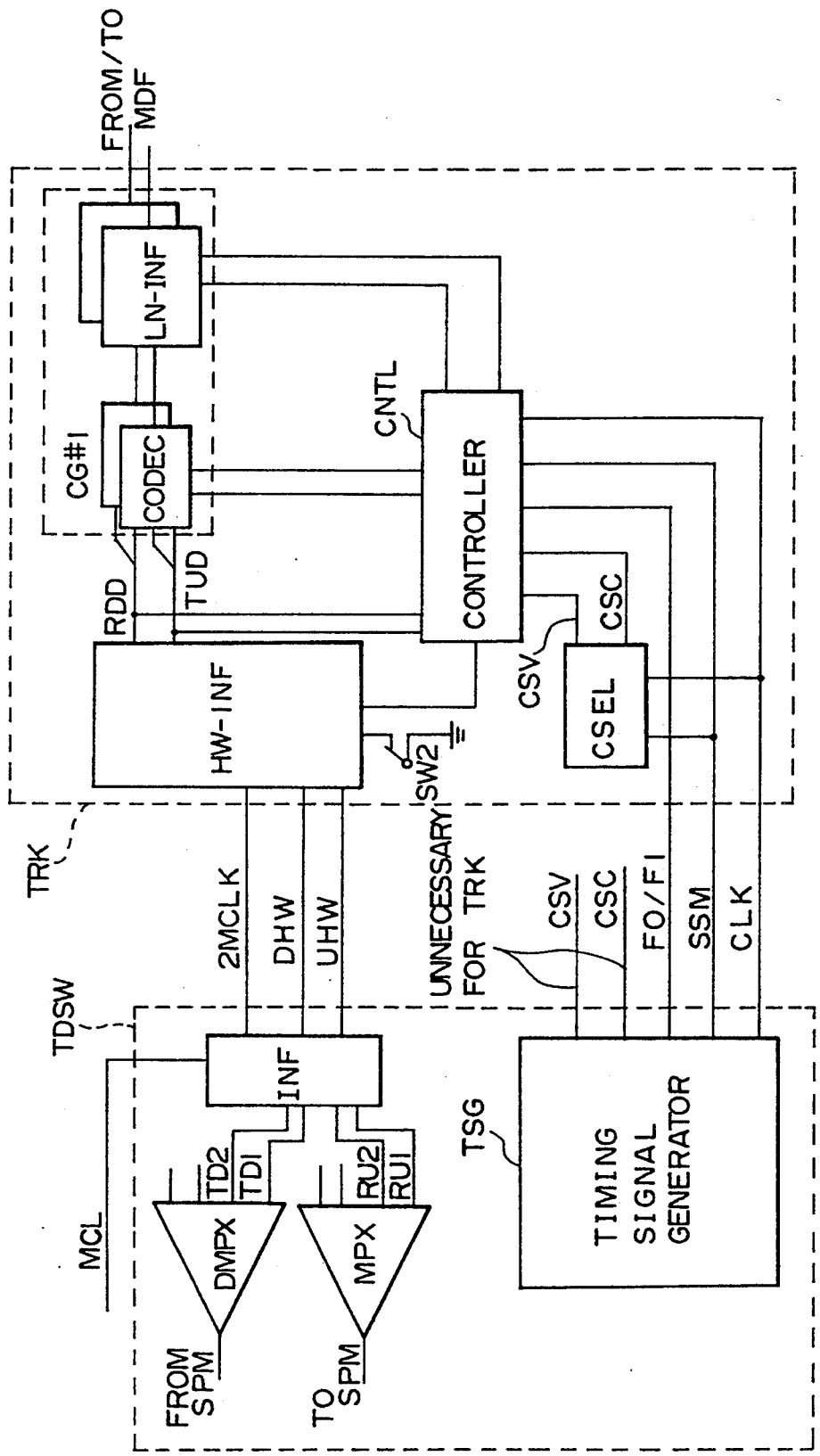
FIG. 13 is a block diagram of a digital exchange according to a third embodiment of the present invention.

FIG. 13 shows an overview of a digital exchange according to the third embodiment of the present invention. More particularly, FIG. 13 shows the time division switch TDSW shown in FIG. 3, and a circuit trunk TRK mounted on a card. The configuration of the time division switch TDSW shown in FIG. 13 is the same as that of the time division switch TDSW shown in FIG. 10. The trunk circuit TRK is configured as follows. The trunk circuit TRK shown in FIG. 13 comprises a highway interface circuit HW-INF, a line group unit CG#1, a controller CNTL, a card slot position setting unit CSEL, and a switch SW2. The switch SW2 corresponds to the aforementioned highway selecting means. The line group unit CG#1 accommodates, for example, eight lines, and comprises codec units (coder/decoder units) CODEC, and line interface circuits LN-INF. The line group unit CG#1 is connected to the main distribution frame MDF shown in FIG. 3. The card slot position setting unit CSEL specifies a logical card slot position of the trunk circuit (card) TRK. The details of the card slot position setting unit CSEL will be described later. The controller CNTL controls the entire operation of the trunk circuit TRK. The highway interface circuit HW-INF will be described in detail later. The timing signals CSV and CSC generated by the timing signal generator TSG are not necessary for the trunk circuit TRK shown in FIG. 13.

Figure 14:
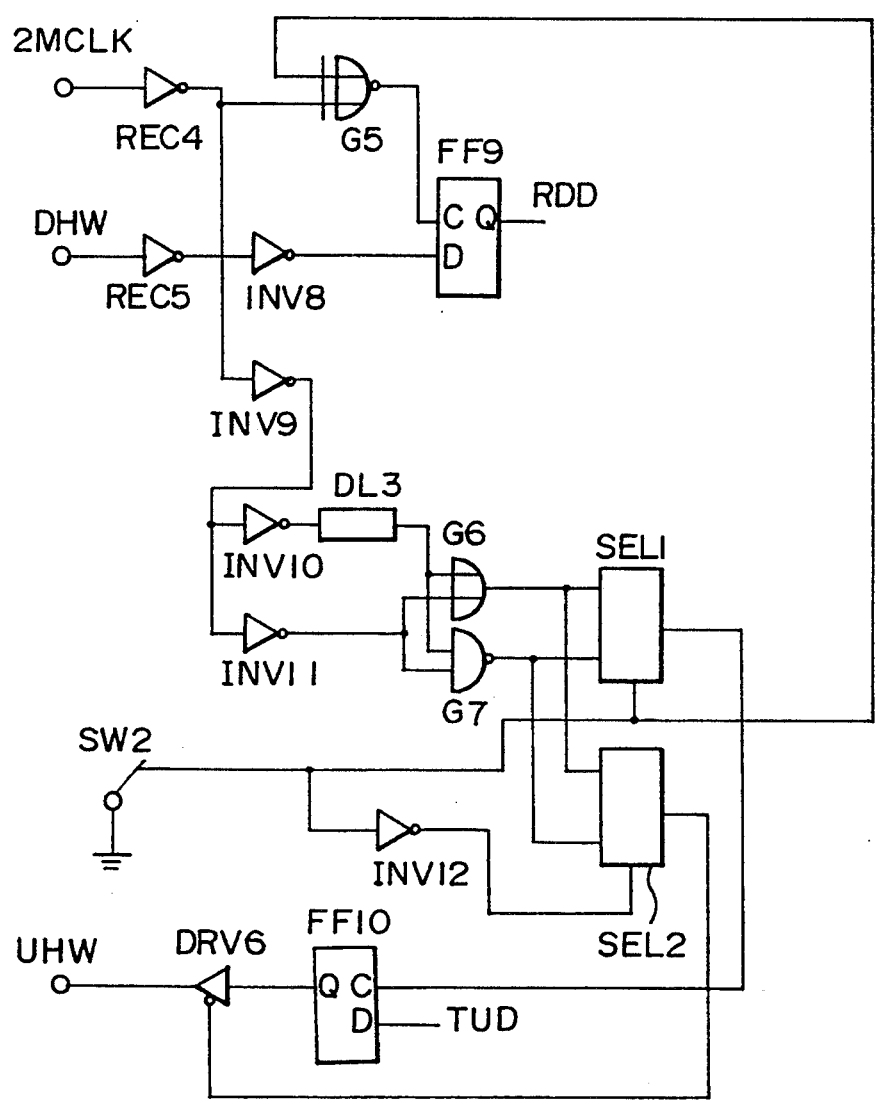
FIG. 14 is a block diagram of a highway interface circuit shown in FIG. 13.

FIG. 14 is a block diagram of the interface circuit INF in the trunk circuit TRK shown in FIG. 13. The interface circuit INF of the third embodiment of the present invention has the function of selecting one of the down highways DH#1 and DH#2 and one of the up highways UH#1 and UH#2. The interface circuit INF shown in FIG. 14 comprises receivers REC4 and REC5, a driver DRV6, inverters INV8–INV12, D-type flip-flops FF9 and FF10, a delay element DL3, selectors SEL1 and SEL2, an exclusive NOR circuit G5, an OR circuit G6 and a. NAND circuit G7.

A circuit made up of the receiver REC4, the inverters INV9–INV11, the delay circuit DL3, the OR circuit G6 and the NAND circuit G7 corresponds to a circuit made up of the receiver REC3, the inverters INV4, INV6 and INV7, the delay circuit DL2, the OR circuit G3 and the NAND circuit G4 shown in FIG. 11. Hence, transmission clock signals, which are 180° out of phase and which have guard times, are obtained from the OR circuit G6 and the NAND circuit G7, respectively. The flip-flop FF9 shown in FIG. 14 corresponds to either the flip-flop FF5 or FF6. The flip-flop FF10 shown in FIG. 14 corresponds to either the flip-flop FF7 or FF8.

When the switch SW2 is turned ON, a signal of "0" is applied to the exclusive NOR circuit G5. Hence, the clock signal 2MCLK received by the receiver REC4 is inverted by the inverter INV9 and applied to a clock terminal C of the flip-flop FF9. Bit-multiplexed data received by the receiver REC5 from the down highway DHW is inverted by the inverter INV8 and applied to a data terminal D of the flip-flop FF9. Received data RDD output via an output terminal Q of the flip-flop FF9 corresponds to received data RD1 output from the flip-flop FF5 shown in FIG. 11.

The selector SEL1 selects the transmission clock signal from the NAND circuit G7, and applies it to a clock terminal C of the flip-flop FF10. The selector SEL2 selects the transmission clock signal from the OR circuit G6, and applies it to a control terminal of the driver DRV6. Transmission data TUD applied to a data terminal D of the flip-flop FF10 corresponds to the transmission data TU1 shown in FIG. 11.

When the switch SW2 is turned OFF, a signal of "1" is applied to the exclusive NOR circuit G5. The clock signal 2MCLK received by the receiver REC4 is applied to the clock terminal C of the flip-flop FF9. The received data RDD from the output terminal Q of the flip-flop FF9 corresponds to the received data RD2 from the flip-flop FF6 shown in FIG. 11. The selector SEL1 selects the transmission clock signal from the OR circuit G6, and the selector SEL2 selects the transmission clock signal from the NAND circuit G7. Hence, transmission data TUD corresponds to the transmission data TU2 applied to the flip-flop FF8 shown in FIG. 11.

Figure 15:
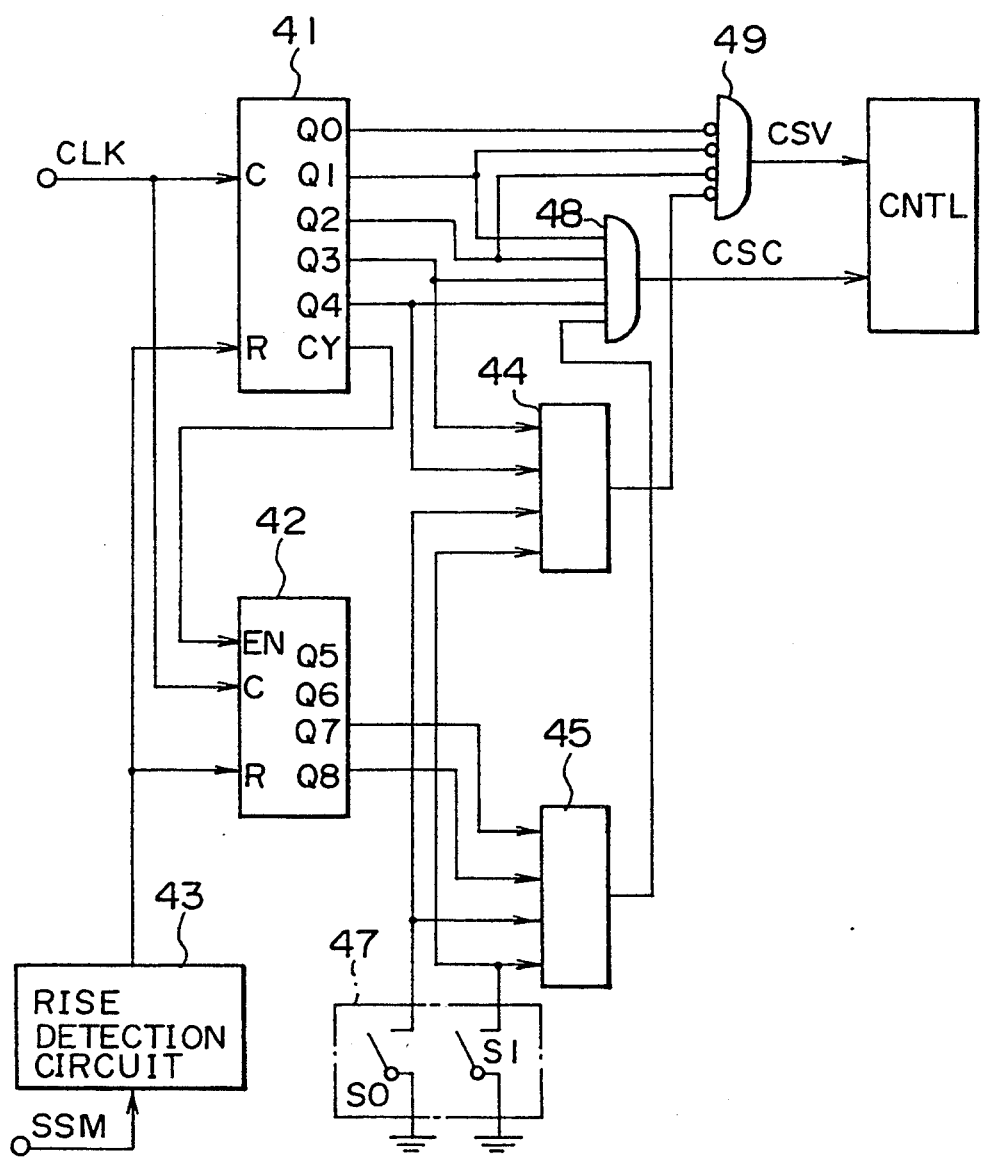
FIG. 15 is a block diagram of a card slot position setting unit shown in FIG. 13.

FIG. 15 is a block diagram of the card slot position setting unit CSEL shown in FIG. 13. The card slot position setting unit CSEL shown in FIG. 13 comprises a time slot counter 41, a frame counter 42, a rise detection circuit 43, coincidence circuits 44 and 45, a setting switch 47, an AND circuit 48, and a NAND circuit 49. The time slot counter 41 and the frame counter 42 are reset by a reset signal applied to respective reset terminals R when the rise detection circuit 43 detects a rise of the send/receive switch timing signal SSM. The time slot counter 41 increments its count value in synchronism with the 256 kHz clock signal CLK applied to a clock terminal C of the time slot counter 41. A carry signal output via a carry terminal CY of the time slot counter 41 is applied to an enable terminal EN of the frame counter 42. The 256 kHz clock signal CLK is also applied to a clock terminal C of the frame counter 42. While the frame counter 42 is maintained in the active state, the frame counter 42 increments its count value in synchronism with the clock signal CLK.

The setting switch 47 comprises switches S0 and S1. When the switches S0 and S1 are ON ("0", "0"), the logical card slot position of the first card slot is specified. When the switches S0 and S1 are OFF and ON ("1", "0"), the logical card slot position of the second card slot is specified. When the switches S0 and S1 are ON and OFF ("0", "1"), the logical card slot position of the third card slot is specified. When the switches S0 and S1 are OFF ("1", "1"), the logical card slot position of the fourth card slot is specified.

Setting signals generated by the switches S0 and S1 of the setting switch 47 are applied to the coincidence circuits 44 and 45. The coincidence circuit 44 compares the output signals of output terminals Q3 and Q4 of the time slot counter 41 with the setting signals from the setting switch 47, and generates a coincidence signal indicating "0" when the signals coincide with each other. This coincidence signal is applied to the NAND circuit 49, which also receives the output signals of output terminals Q0–Q2 of the time slot counter 41. When all the input signals of the NAND circuit 49 are "0", it outputs the timing signal CSV indicating "1" to the controller CNTL. The timing signal CSV functions as a card selecting timing signal for speech signals. The coincidence circuit 45 compares the setting signals from the setting switch 47 with the output signals of output terminals Q7 and Q8 of the frame counter 42, and outputs a detection signal indicating "1" to the AND circuit 48 when the signals coincide with each other. The AND gate 48 also receives the output signals of output terminals Q2, Q3 and Q4 of the time slot counter 41. When all the input signals of the AND circuit 48 are "1", it outputs the timing signal CSC indicating "1" to the controller CNTL. The timing signal CSC functions as a card select timing signal for control signals.

Figure 16:
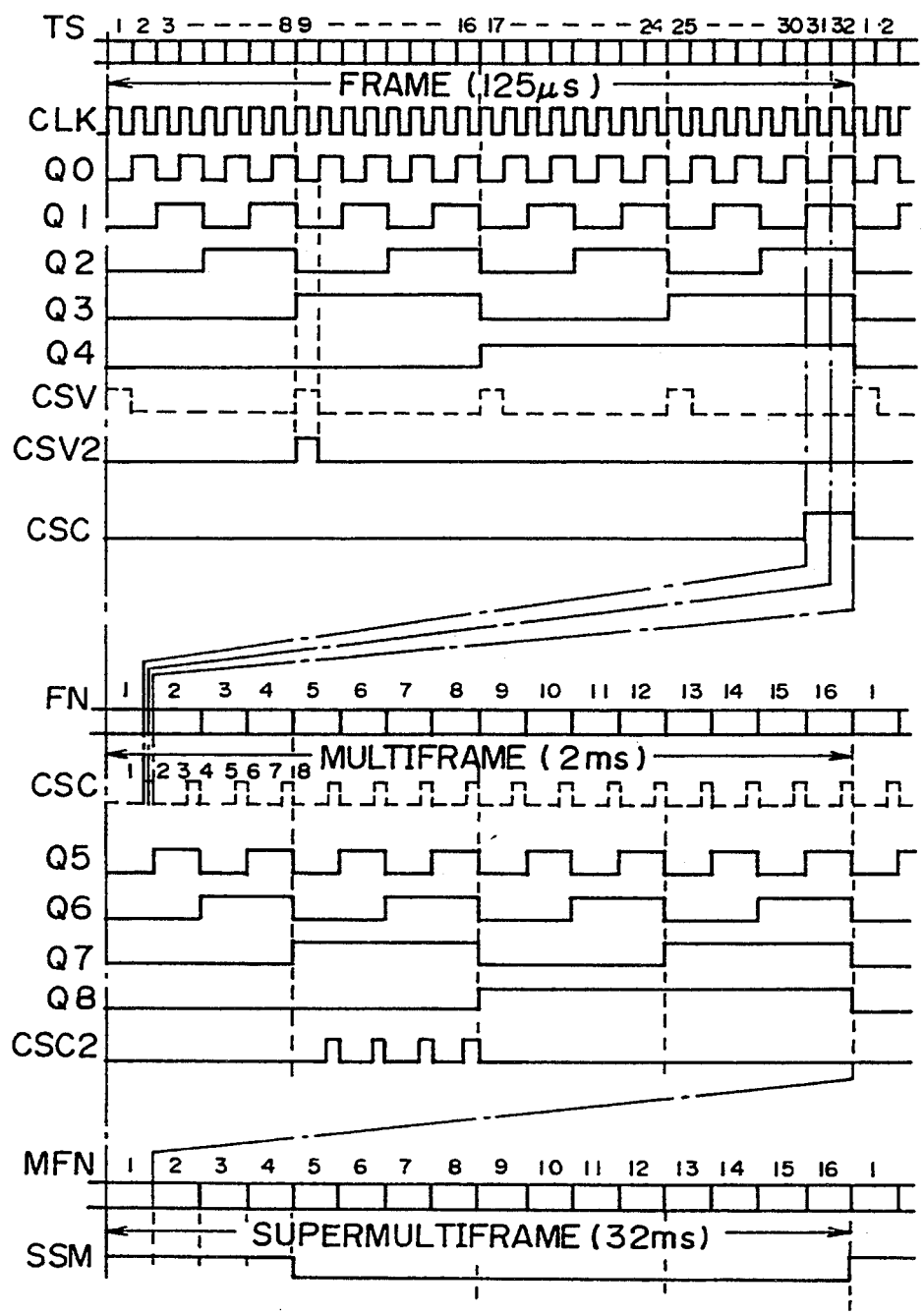
FIG. 16 is a timing chart showing the operation of the card slot position setting unit shown in FIG. 15.

FIG. 16 is a timing chart showing the operation of the third embodiment of the present invention. In FIG. 16, symbols, such as TS, CLK and Q0, have the respective meanings as has been described previously. CSV2 denotes a card select timing signal for speech signals generated when the second card slot position is logically specified. CSC2 denotes a card select timing signal for control signals generated when the second card slot position is logically specified.

If the switches S0 and S1 are respectively OFF and ON so that the second card slot position is specified, the coincidence circuit 44 generates the coincidence detection signal indicating "0" when the output terminals Q3 and Q4 of the time slot counter 41 are equal to "1" and "0", respectively. When the output terminals Q0–Q2 respectively indicate "0", the output signal CSV of the NAND circuit 49 becomes equal to "1". Hence, the timing signal CSV (CSV2) becomes equal to "1" at time slot number 9. That is, the card select timing signal having the same timing as the timing signal CSV2 can be applied to the controller CNTL irrespective of the physical position of the card slot.

When the output signals of the output terminals Q7 and Q8 of the frame counter 42 becomes equal to "1" and "0", respectively, the coincidence detection signal of the coincidence circuit 45 indicates "1". At this time, if the output terminals A1–A4 of the time slot counter 41 respectively become equal to "1", the output signal CSC of the AND circuit 48 becomes equal to "1". That is, the card select timing signal CSC (CSC2) for control signals is generated at each of the time slots 31 and 32 in each of the frames having frame numbers 5–8. The card select timing signals CSC2 respectively generated in time slots 31 and 32 are applied to the controller CNTL. In this manner, it is possible to insert a card in an arbitrary card slot position and specify a physical card slot position by means of the setting switch 47. Further, by generating a plurality of setting signals by means of the setting switch 47, it is possible to generate card select timing signals for speech and control signals with a plurality of timings.

Figure 1:
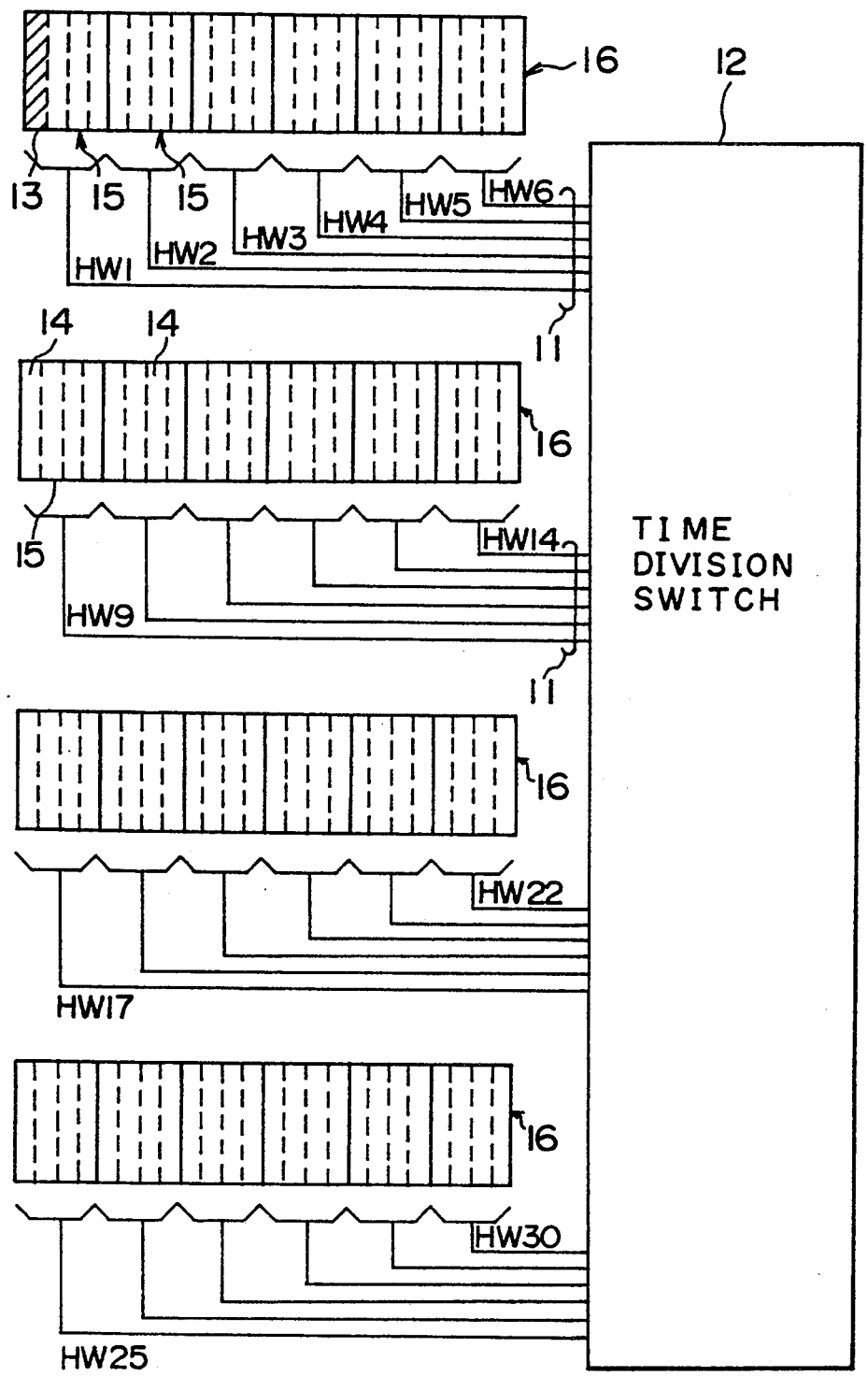
FIG. 1 is a block diagram of a related digital exchange.
Figure 2:
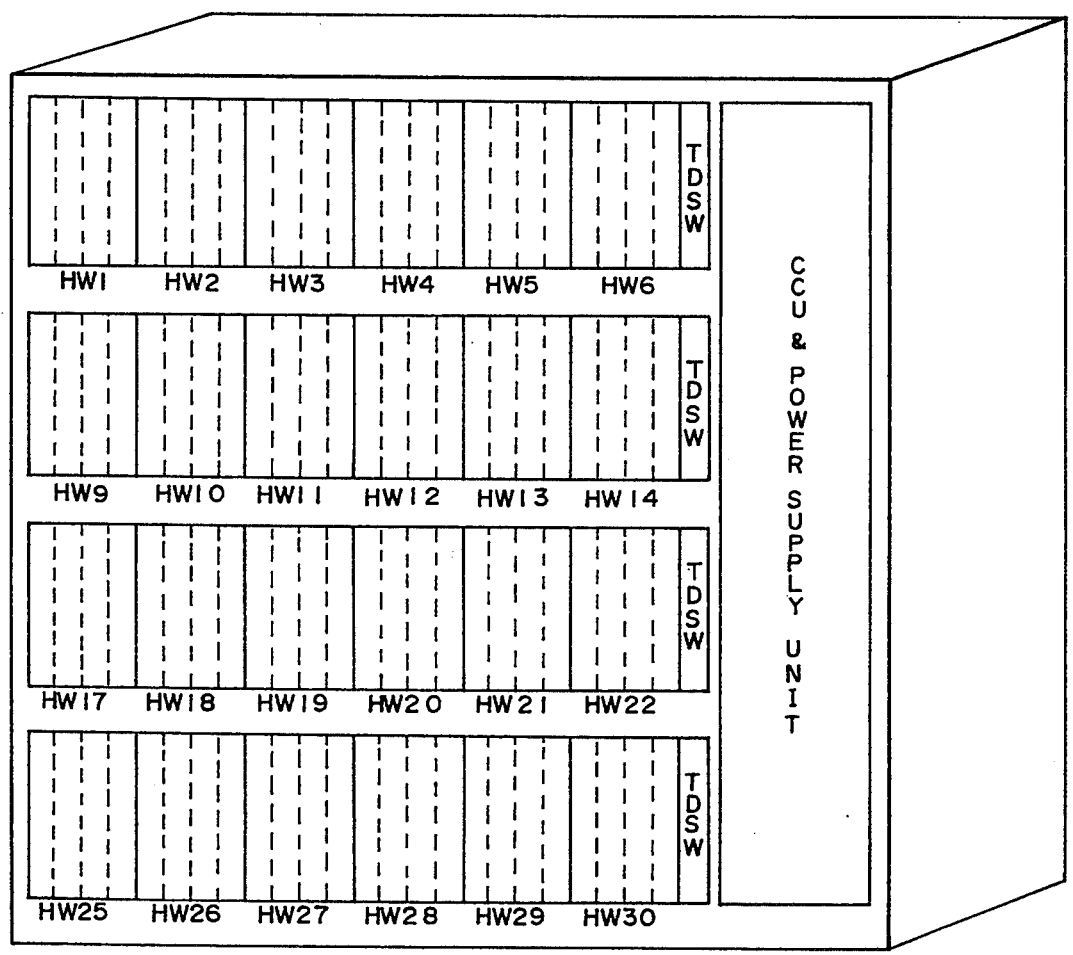
FIG. 2 is a perspective view of an equipment cabinet of the related digital exchange shown in FIG. 1.
Figure 17:
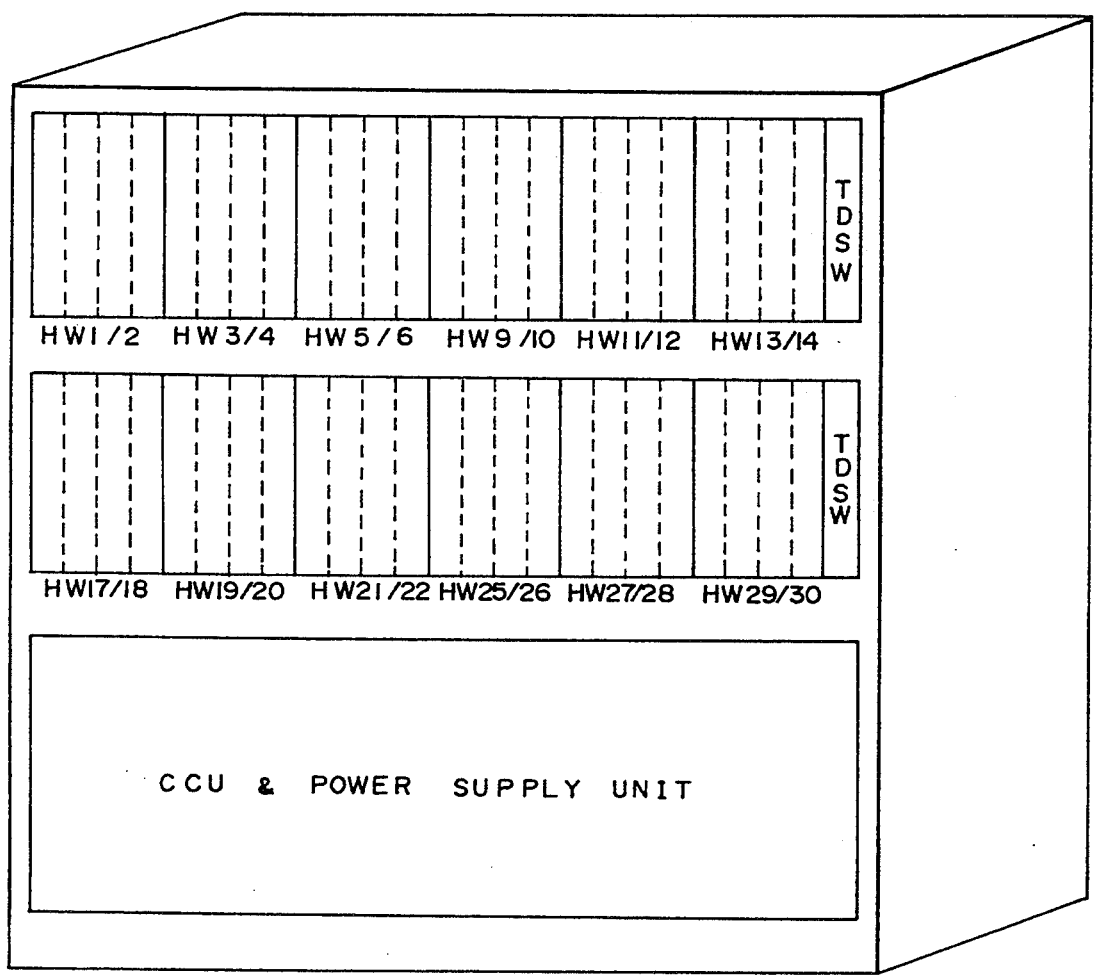
FIG. 17 is a perspective view of an equipment cabinet of the digital exchange according to the second or third embodiment of the present invention.

FIG. 17 is a perspective view of an equipment cabinet of the second or third embodiment of the present invention. As shown in FIG. 17, two highways in time division multiplexing are provided for each card slot group. It can be seen that the cabinet shown in FIG. 17 is much smaller than the cabinet shown in FIG. 2.

Figure 18:
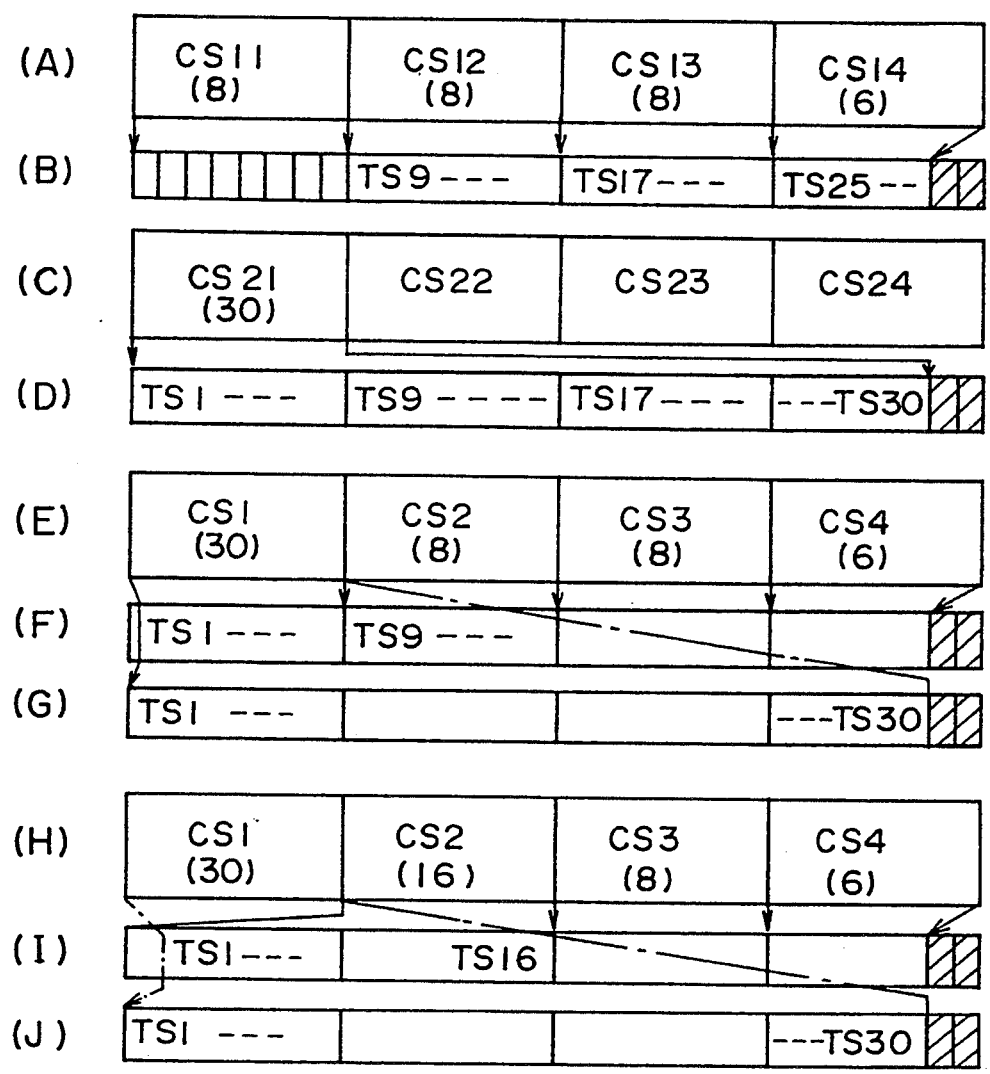
FIG. 18 is a diagram showing physical card slot positions and logical card slot positions.

FIG. 18 is a diagram showing the physical and logical card slot positions. FIGS. 18 (a), (c), (e) and (h) respectively show physical card slot positions, and FIGS.

18(b), (d), (f), (g), (i) and (j) respectively show logical card slot positions, that is, time slot positions on highways. When cards respectively having the numbers of lines as indicated by parentheses in the figure are inserted into card slots CS11–CS14, 32 time slots are assigned as shown in FIG. 18(b). That is, two time slots TS31 and TS32 (illustrated by hatching) out of time slots TS1–TS32 are assigned to control signals. Eight time slots TS1–TS8 are assigned to the card inserted into the first card slot CS11. Eight time slots TS9–TS16 are assigned to the card inserted into the second card slot CS12. Eight time slots TS17–TS24 are assigned to the card inserted into the third card slot CS13. Six time slots TS25–TS30 are assigned to the card inserted into the fourth card slot CS14.

As shown in FIG. 18(c), when a card having 30 lines is inserted into the first card slot CS21, according to the prior art, time slots TS1–TS30 are assigned to the first card slot CS21, and the second through fourth card slots CS22–CS24 are vacant and cannot be used.

According to the present invention, two physical highways or two multiplexed highways as shown in FIGS. 18(f) and (g) are assigned to each of the four card slots CS1–CS4 shown in FIG. 18(e). A card having 30 lines is inserted into the first card slot CS1, and cards having 8, 8 and 6 lines are respectively inserted into the second, third and fourth card slots CS2, CS3 and CS4. Time slots TS9–TS16 of a highway shown in FIG. 18(f) are assigned to the second card slot CS2, and time slots TS17–TS24 of the highway shown in FIG. 18(f) are assigned to the third card slot CS3. Further, time slots TS25–TS30 of the highway shown in FIG. 18(f) are assigned to the fourth card slot CS4. In addition, time slots TS1–TS30 of a highway shown in FIG. 18(g) are assigned to the first card slot CS1. In this manner, the second to fourth card slots CS2–CS4 can accommodate respective cards even when a card having 30 lines is inserted into the first card slot CS. Hence, the card slots can be efficiently used.

Referring to FIG. 18(h), a card having 30 lines is inserted into the first card slot CS1, and a card having 16 lines is inserted into the second card slot CS2. Further, a card having 8 lines is inserted into the third card slot CS3, and a card having 6 lines is inserted into the fourth card slot CS4. In this case, 30 time slots TS1–TS30 of a highway shown in FIG. 18(j) are assigned to the first card slot CS1, and time slots TS1–TS16 of a highway shown in FIG. 18(i) are assigned to the second card slot CS2. Further, time slots TS17–TS24 of the highway shown in FIG. 18(i) are assigned to the third card slot CS3, and time slots TS25–TS30 of the highway shown in FIG. 18(i) are assigned to the fourth card slot CS4.

When cards respectively having 16 lines are inserted into the first to third card slots CS1–CS3, and a card having 12 lines is inserted into the fourth card slot CS4, time slots are assigned as follows. Time slots TS1–TS16 of the highway shown in FIG. 18(j) are assigned to the first card slot CS1. Time slots TS1–TS16 of the highway shown in FIG. 18(i) are assigned to the second card slot CS2. The third card slot CS3 is assigned time slots TS17–TS24 of the highway shown in FIG. 18(i) and time slots TS17–TS24 of the highway shown in FIG. 18(j). The fourth card slot CS4 is assigned time slots TS25–TS30 of the highway shown in FIG. 18(i) and time slots TS25–TS30 of the highway shown in FIG. 18(j).

The present invention is not limited to the specifically disclosed embodiments, and variations and modifications can be made without departing from the scope of the present invention. For example, the card slot position setting unit CSEL can be applied to the first and second embodiments of the present invention. It is possible to omit the card slot position setting unit CSEL from the third embodiment shown in FIG. 13. It is also possible to assign a plurality of highways to some of the card slot groups in a cabinet.

What is claimed is:

1. A multi-highway system in a digital exchange comprising:

time division switch means for exchanging time slots on N highways where N is an integer; and a plurality of card slot groups respectively including a plurality of card slots, cards accommodating a plurality of lines being inserted into said card slots, said N highways connecting said time division switch means and said plurality of card slot groups to each other, at least one of the card slot groups being assigned M highways out of said N highways where M is an integer satisfying $2 \leq M < N$, wherein said cards respectively comprise selecting means for selecting one of the M highways to be used.

2. A multi-highway system as claimed in claim 1, further comprising M physical lines provided for said at least one of the card slot groups, said M physical lines corresponding to said M highways assigned to said at least one of the card slot groups.

3. A multi-highway system as claimed in claim 1, further comprising a physical line in which said M highways are formed in time division multiplexing.

4. A multi-highway system as claimed in claim 3, wherein:

said M is equal to 2, and wherein said multi-highway system further comprises means for alternately selecting said M highways one by one in order to transfer data between said time division switch means and at least one of the card slot groups.

5. A multi-highway system as claimed in claim 1, further comprising means for sequentially specifying one of the M highways to be used.

6. A multi-highway system as claimed in claim 1, further comprising a first line including at least M highways and being used for transferring data from said time division switch means to said at least one of the card slot groups, and a second line including at least M highways and being used for transferring data from said at least one of the card slot groups to said time division switch means, wherein:

said time division switch means comprises first means for sequentially specifying one of the M highways of the first line to transmit data to said at least one of the card slot groups and for sequentially specifying one of the M highways of the second line to separately receive data from said at least one of the card slot groups; and the cards comprise second means for sequentially specifying one of the M highways of the first line to separately receive the data from said time division switch means and for sequentially specifying one of the M highways of the second line to transmit data to said time division switch means.

7. A multi-highway system as claimed in claim 1, further comprising means for setting a logical card slot position of each of said cards.

8. A digital exchange comprising:
time division switch means for exchanging time slots on N highways where N is an integer;
a plurality of line circuits, coupled to said time division switch means and formed on cards having a plurality of lines, for connecting a plurality of terminals and said time division switch means to each other;
a plurality of trunk circuits, coupled to said time division switch means and formed on cards having a plurality of lines, for connecting said time division switch means and a network to each other; and
a plurality of card slot groups respectively including a plurality of card slots into which said cards are accommodated,
said N highways connecting said time division switch means and said plurality of card slot groups to each other,
at least one of the card slot groups being assigned M highways out of said N highways where M is an integer satisfying $2 \leq M < N$,
wherein said cards respectively comprise selection means for selecting one of the M highways to be used.

9. A digital exchange as claimed in claim 8, further comprising M physical lines provided for said at least one of the card slot groups, said M physical lines corresponding to said M highways assigned to said at least one of the card slot groups.

10. A digital exchange as claimed in claim 8, further comprising a physical line in which said M highways are formed in time division multiplexing.

11. A digital exchange as claimed in claim 10, wherein:
said M is equal to 2, and
wherein said multi-highway system further comprise means for alternately selecting said M highways one by one in order to transfer data between said time division switch means and at least one of the card slot groups.

12. A digital exchange as claimed in claim 8, further comprising means for sequentially specifying one of the M highways to be used.

13. A digital exchange as claimed in claim 8, further comprising a first line including at least M highways and being used for transferring data from said time division switch means to said at least one of the card slot groups, and a second line including at least M highways and being used for transferring data from said at least one of the card slot groups to said time division switch means,
wherein:
said time division switch means comprises first means for sequentially specifying one of the M highways of the first line to transmit data to said at least one of the card slot groups and for sequentially specifying one of the M highways of the second line to separately receive data from said at least one of the card slot groups; and
the cards comprise second means for sequentially specifying one of the M highways of the first line to separately receive the data from said time division switch means and for sequentially specifying one of the M highways of the second line to transmit data to said time division switch means.

14. A digital exchange as claimed in claim 8, further comprising means for setting a logical card slot position of each of said cards.

* * * * *